(12) United States Patent
Kojima

(10) Patent No.: US 7,640,227 B2
(45) Date of Patent: Dec. 29, 2009

(54) RECORDING MEDIUM HAVING A FILE SHARING PROGRAM RECORDED THEREON AND FILE SHARING APPARATUS

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 11/246,380

(22) Filed: Oct. 7, 2005

(65) Prior Publication Data

US 2006/0294053 A1 Dec. 28, 2006

(30) Foreign Application Priority Data

Jun. 23, 2005 (JP) ............................. 2005-183816

(51) Int. Cl.
 *G06F 7/00* (2006.01)
(52) U.S. Cl. ....................... 707/1; 707/104.1
(58) Field of Classification Search ................ 707/200, 707/1, 104.1; 709/228; 713/1; 715/789; 705/10

See application file for complete search history.

(56) References Cited

U.S. PATENT DOCUMENTS

| | | | | |
|---|---|---|---|---|
| 6,640,249 B1 * | 10/2003 | Bowman-Amuah | ......... | 709/228 |
| 7,000,194 B1 * | 2/2006 | Newbold | ..................... | 715/789 |
| 2002/0073065 A1 * | 6/2002 | Inaba et al. | ..................... | 707/1 |
| 2004/0107242 A1 * | 6/2004 | Vert et al. | .................... | 709/203 |
| 2005/0086457 A1 * | 4/2005 | Hohman | ......................... | 713/1 |
| 2005/0261953 A1 * | 11/2005 | Malek et al. | ................... | 705/10 |

OTHER PUBLICATIONS

Justin Yackodki, Chien-Chung Shen, UW-FLASHR: Achieving High Channel Utilization in a Time-Based Acoustic MAC Protocol, Sep. 15, 2008, ACM, pp. 1-8.*
IEEE, no matched results, Sep. 30, 2009, p. 1.*
Integrating applications using Websphere Business Integration Message Broker V5, google.com, pp. 1-29.*

* cited by examiner

*Primary Examiner*—Mohammad Ali
*Assistant Examiner*—Donald Lawson
(74) *Attorney, Agent, or Firm*—Katten Muchin Rosenman LLP

(57) ABSTRACT

A computer-readable recording medium is disclosed that stores a file sharing program causing a computer connected to a network of nodes and sharing a file with the nodes in a decentralized manner to execute a method including the steps of: checking the number of approvals by nodes approving a change application for changing the profile information of the file stored in the storage part of the computer upon receiving the change application; promoting the change application to a change instruction to change the profile information, propagating the change instruction to another node, and changing the profile information, if the number of the approvals by the approving nodes and an approval by the computer exceeds a predetermined amount; and propagating the change application to the other node if the number of the approvals by the approving nodes and the approval by the computer does not exceed the predetermined amount.

9 Claims, 10 Drawing Sheets

FIG.9

| FILE ID | ITEM NAME | P2P NODE ID1 | | P2P NODE ID2 | | |
|---|---|---|---|---|---|---|
| | | SEARCH NUMBER | CHANGE APPLICATION PROMOTION NUMBER | SEARCH NUMBER | CHANGE APPLICATION PROMOTION NUMBER | ... |
| abcd-node1 | ITEM NAME a1 | 1 | 3 | 7 | 4 | ... |
| | ITEM NAME a2 | 6 | 8 | 1 | 5 | ... |
| abcx-node3 | ITEM NAME a1 | 2 | 3 | 0 | 4 | ... |
| efgh-node1 | ITEM NAME e2 | 1 | 2 | 0 | 0 | ... |

FIG.10

| VOTING NUMBER |
|---|
| 53 |

FIG.11

| AUTHORITY FLAG |
|---|
| MINIMUM RETENTION TIME |
| MAXIMUM RETENTION TIME |
| FILE ID |
| ITEM FIELD<br>1or2or...n<br><table><tr><td>ITEM NAME</td></tr><tr><td>ITEM CONTENTS</td></tr></table> |

RECORDING MEDIUM HAVING A FILE SHARING PROGRAM RECORDED THEREON AND FILE SHARING APPARATUS

BACKGROUND OF THE INVENTION

1. Field of the Invention

The present invention relates generally to recording media having a file sharing program recorded thereon and file sharing apparatuses, and more particularly to a recording medium on which is recorded a file sharing program for sharing a file in a decentralized manner on a network configured of multiple nodes, and to a file sharing apparatus sharing a file in a decentralized manner on a network configured of multiple nodes.

2. Description of the Related Art

In recent years, peer-to-peer (P2P) networks and corporate groupware using a P2P network have been popular. On P2P networks, multiple P2P nodes configure a network so that a file can be shared in a decentralized manner among the P2P nodes.

Each P2P node has a storage unit for storing a file (the entity of a file). By copying the entity of the file (file entity) stored in the storage unit among the P2P nodes, the file entity is shared in a decentralized manner. That is, copies of a certain file are retained by multiple P2P nodes when viewing the entire network.

There are two methods for actual application of the P2P network: sharing file entities among P2P nodes in a decentralized manner and performing centralized management of a list of the files (file list) with a server; and managing file entities in a decentralized manner without a server by sharing the file entities including their file list among P2P nodes in a decentralized manner. Here, a description is given of the latter application method of managing the file list in a decentralized manner.

FIG. 1 is a diagram showing a P2P network. The P2P network of FIG. 1 is configured of four P2P nodes (hereinafter referred to simply as "nodes") 1 through 4. The P2P network of FIG. 1 has a file list configured of file names and file entity pointers. The file entity pointers are pointers to file entities.

The file entity pointer may point to a storage area of the file entity storage unit of one node or point to a storage area of the file entity storage unit of another node. A format that expresses both in a unified manner in the file entity pointer depends on each application.

In starting file sharing on a P2P network, a node to publish a file (publishing node) determines the file name of a file to be published, and publishes to the P2P network a file list entry where a file entity pointer points to its own file entity storage unit.

This file list entry is passed from one node to another, and is added to a file list retained by each node. On the P2P network, the file list entry is added to the file list of each node, so that the file list is shared in a decentralized manner among the nodes.

Next, a node to retrieve a file transmits a search request to other nodes connected to the node using at least part of the file name of the file that the node desires to obtain as a keyword. FIG. 1 shows the case where the node 1 transmits a search request to the nodes 2 through 4 using a file name "mn" as a keyword.

The search request is passed from one node to another on the P2P network. Each node receiving the search request searches the file list it retains. If the node searches out a corresponding entry, the node returns a search result including a file name and a corresponding file entity pointer to the node that has transmitted the search request (originating node).

In the case of FIG. 1, the node 4 has a corresponding entry, and the node 4 returns a search result including a file name "mnop" and a file entity pointer "ptr-mnop" to the originating node 1.

As a result, in a certain period of time, the originating node receives multiple search results. The originating node selects one of the received search results based on a certain selection criterion. Then, the originating node establishes a connection to the node indicated by the file entity pointer included in the selected search result, and copies and obtains a corresponding file entity.

The above-described selection criterion may be, for instance, appropriateness of a file name by reference to the entire file name, closeness in distance from the originating node to the node indicated by the file entity pointer, or width of the communication band between the originating node and the node indicated by the file entity pointer.

The connection for file forwarding between the originating node and the node indicated by the file entity pointer may be established directly or via one or more other nodes. In the latter case, the target file entity may be copied and thereafter retained by the other intermediary nodes. Thus, the file entity is copied and retained in a decentralized manner in multiple nodes.

In general, the prevailing P2P networks have a file shared among nodes by only file name. Alternatively, for instance, as shown in FIG. 2, not only a file name but also the profile of a file (file profile) may be shared among nodes (for instance, United States Patent Application Publication No. US 2004/0107242). The file profile, which is also referred to as the metadata of a file, is attribute information concomitant with a file.

For example, in the case of a file for word processing software, the file profile includes a title, a subtitle, a creator, and a version. In the case of an image or video file, the file profile includes its encoding method, etc. Items necessary for the file profile differ depending on the file type (for example, a word processing software file, an image file, etc.).

According to the conventional P2P network, a publishing node determines the file profile of a file to be published like a file name, and publishes a file list entry having a set of the file name, file entity pointer, and file profile to the P2P network.

Thereafter, the file list entry is transmitted through the P2P network as described above. On the other hand, at the time of a file search, it is possible to create a search request with not only at least part of a file name but also a file profile being included therein.

However, according to the conventional P2P network, a file profile to be shared is set by the originating node of a file. Accordingly, there is a problem in that another node is prevented from changing the already shared file profile to a more suitable one.

SUMMARY OF THE INVENTION

Accordingly, it is a general object of the present invention to provide a recording medium on which is recorded a file sharing program and a file sharing apparatus in which the above-described disadvantage is eliminated.

A more specific object of the present invention is to provide a recording medium on which is recorded a file sharing program and a file sharing apparatus that enable multiple nodes to create a more suitable file profile in cooperation with each other.

The above objects of the present invention are achieved by a computer-readable recording medium on which is recorded a file sharing program to be executed in a computer connected to a network including a plurality of nodes and sharing a file with the nodes in a decentralized manner, the computer including a storage part configured to store an entity of the file, a file list including the file, and profile information of the file, the file sharing program causing the computer to execute a method including the steps of: (a) checking a number of approvals by those of the nodes approving a change application for changing the profile information of the file upon receiving the change application; (b) promoting the change application to a change instruction to change the profile information of the file, propagating the change instruction to another one of the nodes, and changing the profile information of the file stored in the storage part in response to the change instruction, if a number of the approvals by the approving nodes and an approval by the computer exceeds a predetermined amount; and (c) propagating the change application to the other one of the nodes if the number of the approvals by the approving nodes and the approval by the computer does not exceed the predetermined amount.

The above objects of the present invention are also achieved by a file sharing apparatus connected to a network including a plurality of nodes and sharing a file with the nodes in a decentralized manner, the file sharing apparatus including: a storage part configured to store an entity of the file, a file list including the file, and profile information of the file; a communication part configured to receive and transmit a change application for changing the profile information of the file and a change instruction to change the profile information of the file; and a processing part configured to check a number of approvals by those of the nodes approving the change application upon receiving the change application; promote the change application to the change instruction, propagate the change instruction to another one of the nodes via the communication part, and change the profile information of the file stored in the storage part in response to the change instruction, if a number of the approvals by the approving nodes and an approval by the file sharing apparatus exceeds a predetermined amount; and propagate the change application to the other one of the nodes via the communication part if the number of the approvals by the approving nodes and the approval by the file sharing apparatus does not exceed the predetermined amount.

According to one embodiment of the present invention, if the number of approvals of a file profile change application exceeds a predetermined amount, the change application is promoted to a file profile change instruction, and file profile information is changed based on the change instruction. Accordingly, the file profile information is prevented from being changed unless the number of approvals obtained exceeds the predetermined amount. That is, the file profile information is changed based on a change application that has obtained approvals of which the number exceeds the predetermined amount. As a result, it is possible to create the file profile information cooperatively based on approval by nodes exceeding the predetermined amount. Thus, it is possible to provide a recording medium on which is recorded a file sharing program and a file sharing apparatus that enable multiple nodes to create a more suitable file profile in cooperation with each other.

BRIEF DESCRIPTION OF THE DRAWINGS

Other objects, features and advantages of the present invention will become more apparent from the following detailed description when read in conjunction with the accompanying drawings, in which:

FIG. 9 shows a search history and change application promotion history list according to a third embodiment of the present invention;

FIG. 10 is a diagram showing a past voting history retained by a node according to the third embodiment of the present invention; and FIG. 11 is a diagram showing an authority token format according to a fourth embodiment of the present invention.

DETAILED DESCRIPTION OF THE PREFERRED EMBODIMENTS

Next, a description is given, with reference to the accompanying drawings, of embodiments of the present invention.

File sharing on the conventional P2P network is not a completely synchronous file sharing model in which all nodes have the same file entities and file list, but a flexible file sharing model not requiring complete synchronization where some nodes (for instance, those close to each other in distance or those having similar past search histories) share some file entities and have file lists equal to each other to some extent.

This flexible file sharing model increases system scalability in file sharing on the conventional P2P network, thus making it possible to achieve an extremely large-scale P2P network.

In order to preserve the superior scalability of the conventional P2P network, file sharing on a P2P network according to the present invention does not ensure complete synchronization of file profiles, either, but is caused to be a file sharing model that converges somewhat moderately.

Considering handling of new types of files and additional new items to existing files, a file profile is prevented from having fixed item names in advance in a P2P system. In the conventional P2P system where a file profile has fixed item names, the system installed in each node should be upgraded even in handling new types of files or additional new items to existing files. A P2P system according to the present invention is free of system upgrading.

Thus, according to one aspect of the present invention, a node transmits and propagates a file profile change application for changing or modifying a file profile. If there are competing file profile change applications, a node according to the present invention aggregates approvals of each of the file profile change applications, compares the approvals of the respective file profile change applications, and selects one of the file profile change applications. As a result, if a certain number of approvals can be obtained from other nodes within a certain period of time, the node of the present invention promotes the file profile change application to a file profile change instruction, and propagates the file profile change instruction to other nodes. The file profile is changed or modified as a result of propagation of the file profile change instruction.

Figure 1:
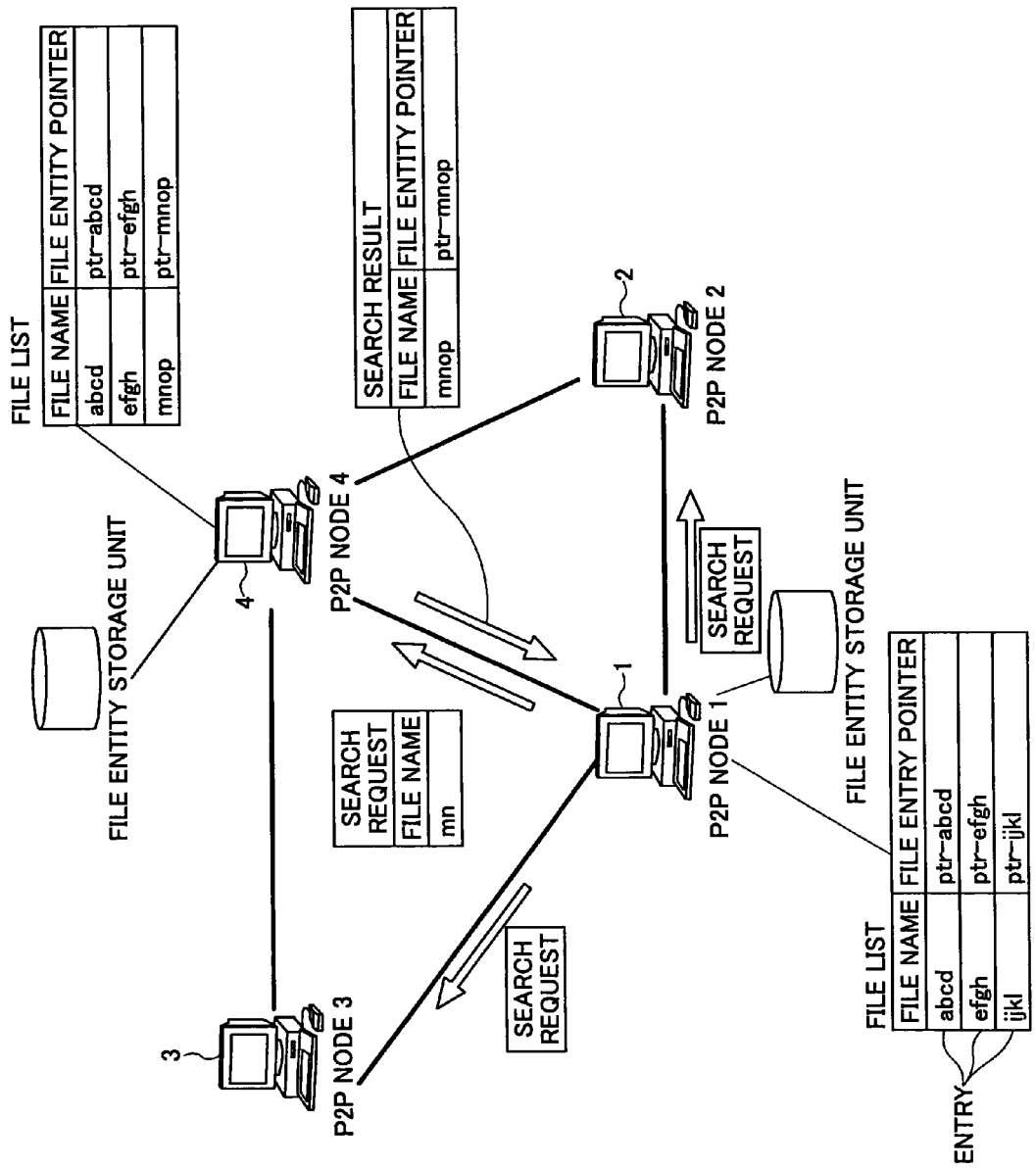
FIG. 1 is a diagram showing a P2P network.
Figure 2:
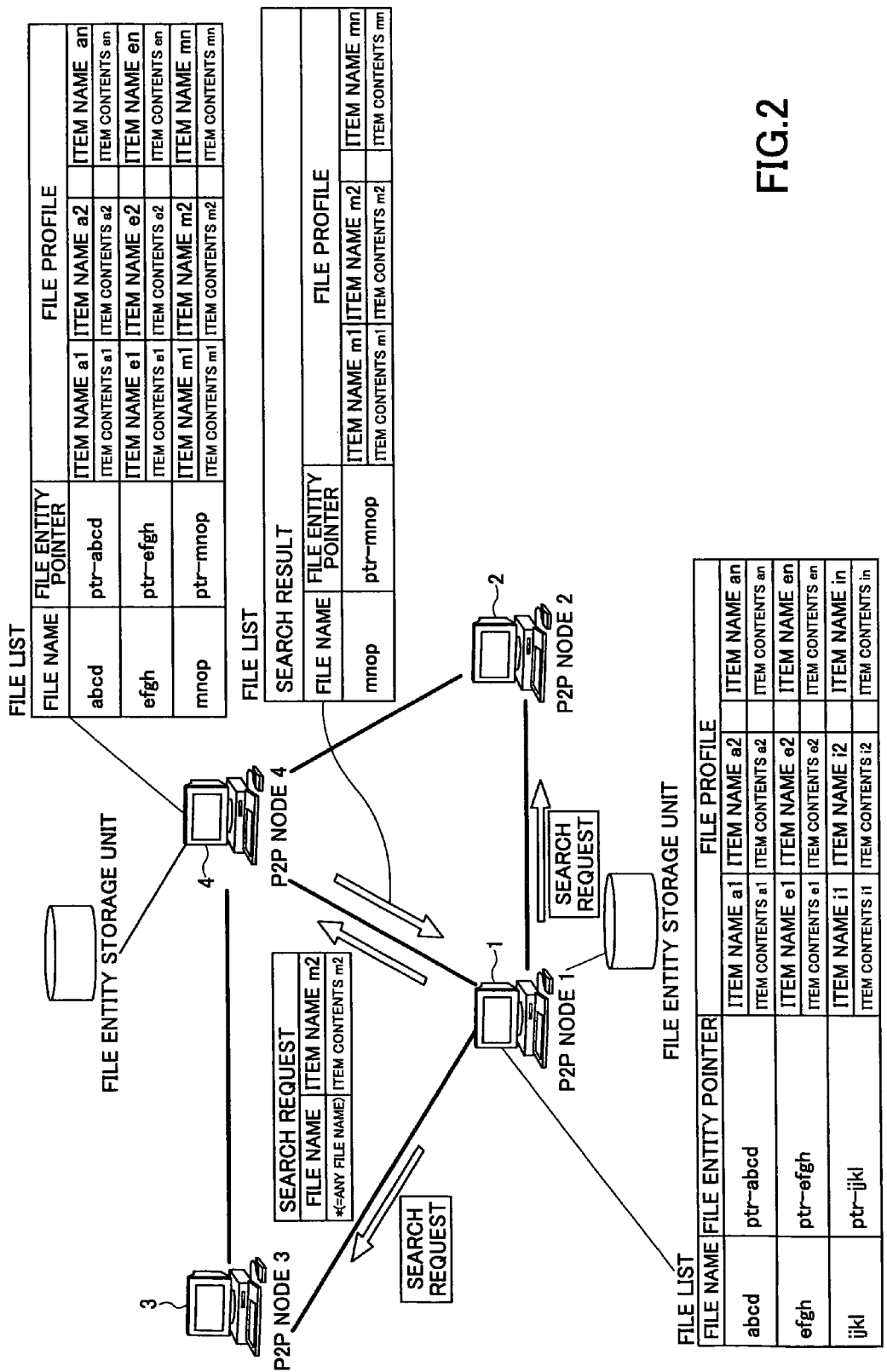
FIG. 2 is a diagram showing another P2P network.
Figure 3:
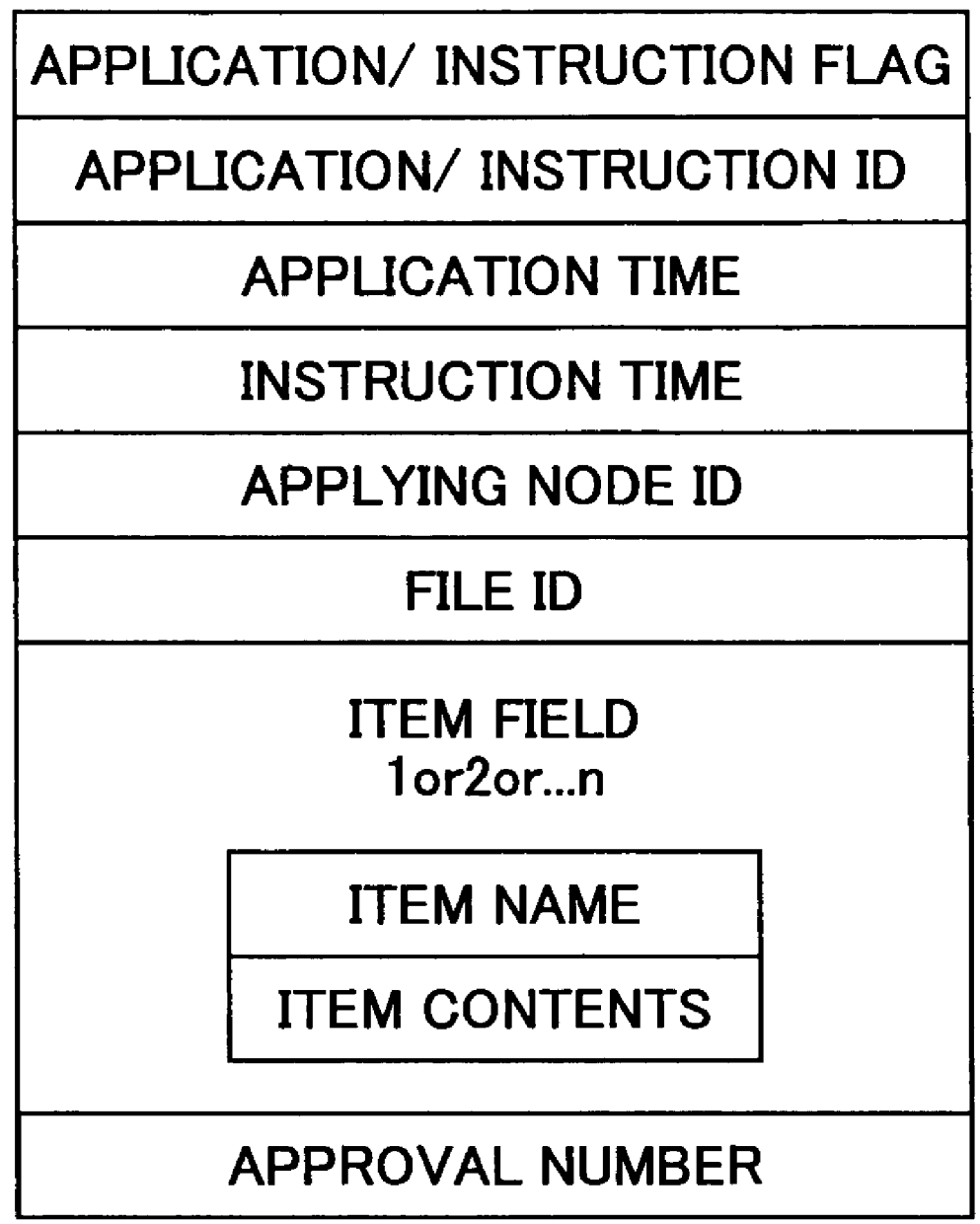
FIG. 3 is a diagram showing a format of a file profile change application and a file profile change instruction according to a first embodiment of the present invention.

As shown in FIG. 3, each of a file profile change application format and a file profile change instruction format includes an item field for storing an item name and item contents set by a node so that each node can set a configuration of item names of a file profile depending on a file type.

First Embodiment

FIG. 3 is a diagram showing a format of the file profile change application and the file profile change instruction according to a first embodiment of the present invention. The format of the file profile change application and the file profile change instruction includes an application/instruction flag, an application/instruction ID, an application time, an instruction time, an applying node ID, a file ID, the item field, and an approval number.

The application/instruction flag indicates either an application or instruction. The application/instruction ID is created by combining the network-unique ID of an applying node transmitting the file profile change application with, for example, an application time (a time of application of the file profile change application by the applying node). The application/instruction ID identifies the file profile change application uniquely on the network. The application time indicates the time of application of the file profile change application by the applying node. The instruction time indicates a time of promotion of the file profile change application to the file profile change instruction.

The applying node ID shows the network-unique ID of the applying node, which may be the IP address of the applying node. The file ID indicates the network-unique ID of a file targeted by the file profile change application or the file profile change instruction.

In general, file lists do not synchronize completely on the P2P network. Accordingly, when a node publishes a file, it is impossible to ensure that the name of the file is not a duplicate of any of the names of the other existing files. Therefore, according to one aspect of the present invention, the file profile change application and the file profile change instruction are provided with the file ID, which is the network-unique ID of a file, as means for uniquely identifying the file. The file ID may be created by combining the network-unique IP address of the applying node with the application time.

The item field indicates a field to be changed. The item field stores the field to be changed. The item field stores an item name and item contents. The item name may be a "creator name." The item contents may be "Yuji Kojima." Conventionally, item names are statically determined or fixed depending on a file type (for instance, a word processing software file).

According to one aspect of the present invention, a node can also set an item (an item name and item contents). An item is added by transmitting a file profile change application for changing a blank item field with no item name and item contents in a file list retained by the node. An item is deleted by transmitting a file profile change application for deleting an item name and item contents from an item field (rendering an item field blank) in the file list retained by the node. The approval number indicates the number of approvals obtained for the file profile change application while the file profile change application propagates through nodes.

In the file list of the node, the item names are not fixed values determined file type by file type as in the conventional file list, but item fields are provided so that the item names are set values of the item fields. This makes it possible to handle new type of files and additional new items to existing files without upgrading the P2P system.

Figure 4:
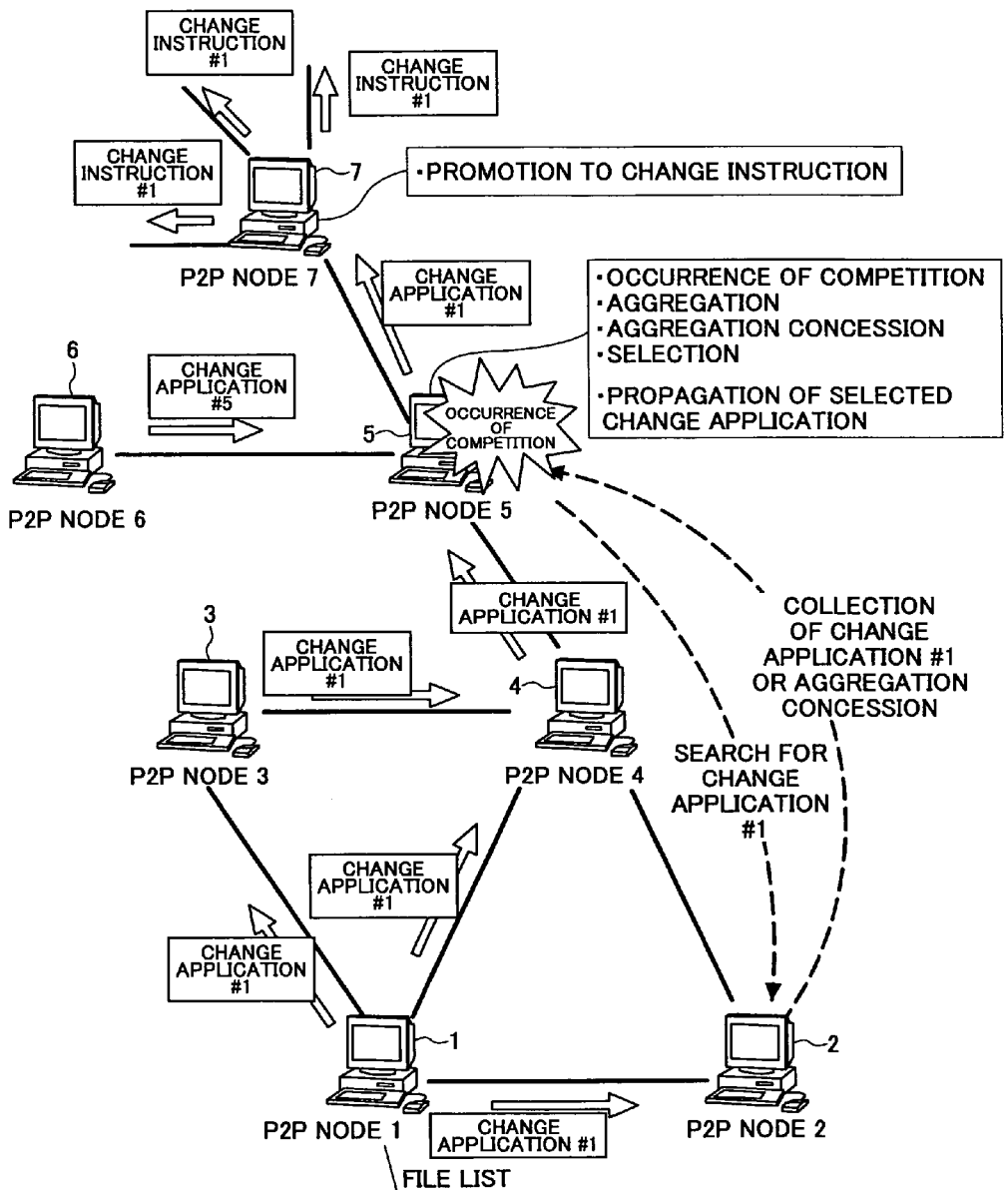
FIG. 4 is an image diagram showing a file profile change procedure according to the first embodiment of the present invention.

Next, a description is given of a procedure for changing or modifying a file profile according to the present invention. FIG. 4 is an image diagram showing a file profile change procedure according to the first embodiment of the present invention. First, the node 1, which is an applying node, creates a file profile change application (#1) in the file profile change application format shown in FIG. 3, and propagates the file profile change application (#1) to multiple nodes connected to the node 1 on the P2P network.

A node receiving the file profile change application stores the application/instruction ID thereof in a cache, thereby preventing a file profile change application of the same application/instruction ID from being processed redundantly.

If the application/instruction ID is new, the node checks the application time of the file profile change application. If the node determines from the application time that a certain period of time as determined for a P2P system is exceeded, the node discards the file profile change application. If the file profile change application is not to be discarded and the approval number thereof exceeds a certain amount, for example, a certain number, the node changes the file profile of its file list. Then, the node promotes the file profile change application to a file profile change instruction, and propagates the file profile change instruction to another node. For example, in the case of FIG. 4, a node 7 promotes the file profile change application (#1) to a file profile change instruction (#1).

If the file profile change application is to be neither discarded nor promoted, the node retains the file profile change application for a certain period of time as determined for a P2P system after receiving the file profile change application. After retaining the file profile change application for the determined period of time, the node increments the approval number of the file profile change application if the node approves the file profile change application, and propagates the file profile change application to another node.

If the node does not approve the file profile change application, the node propagates the file profile change application as it is to another node without incrementing the approval number of the file profile change application. Since the file profile change application is valid for a limited period of time, the probability of promotion of the file profile change application to a file profile change instruction is reduced.

Referring to FIG. 4, of the recipient nodes of the file profile change application (#1), a node 5, in which the file profile change application (#1) competes with another file profile change application (#5) (from a node 6) already retained by the node 5 and having the same item field to be changed, selects one of the competing file profile change applications and discards the other one of the competing file profile change applications based on their respective approval numbers. The probability of promotion of the discarded one of the competing file profile change applications to a file profile change instruction is reduced.

At the time of selecting one of the competing file profile change applications, the node 5 searches other nodes, and collects the same file profile change applications as the file profile change applications (#1 and #5). Then, the node 5 merges approvals of each of the file profile change applications (#1 and #5), and selects one of the competing file profile change applications based on their respective merged approvals.

Multiple nodes may perform the operation of aggregating approvals in the same period. In this case, one of the nodes concedes this aggregation operation to another one of the nodes, and transmits the aggregation results up to the present thereto. As a criterion for this concession of the aggregation operation, for example, the aggregation operation is conceded to a node whose node ID, which is a network-unique ID, is lower. A certain uniform rule may be made as this criterion for concession of the aggregation operation. After performing the aggregation concession operation (if necessary), the aggregation operation, and the selection operation, the node 5 propagates the selected file profile change application to another node.

A node receiving the file profile change instruction checks the instruction time thereof. If the file profile change instruction is within a period of validity, the node changes or modifies the file profile of its file list, and propagates the file profile change instruction to another node. The node discards the file profile change instruction if it is too old.

Next, a description is given of a procedure for publication of a new file by a node. First, the node conducts a search over the P2P network with the item names of a file profile created by default depending on the type of a file to be newly published.

If the search results show that a file of the same type has been published, the node fills the item fields of the file profile with item names and item contents referring to the file of the same type, and publishes the new file. If the search results show that the file to be published is of a new type, the node fills the item fields of the file profile with appropriate item names and item contents considered necessary for the file, and publishes the file. The file may be published with the item names and item contents of the file profile being entered automatically by a file sharing program or entered by a user. In the case of publishing a file with the item names and item contents of the file profile being entered by a user, the node displays a screen for causing the user to determine the item names and item contents of the file profile on a display unit.

As described above, according to one aspect of the present invention, the file profile of a file list is changed or modified based on a file profile change application by a node, and therefore, is prevented from being changed or modified suddenly. Accordingly, it is possible to stabilize the file sharing condition of the P2P network to some extent. Further, according to one aspect of the present invention, the operation of aggregating approvals of each of competing file profile change applications and the operation of selecting one of the competing file profile change applications are not performed in a server at a single point on the P2P network. Accordingly, it is possible to maintain the scalability of the P2P network. Further, according to one aspect of the present invention, multiple nodes determine appropriateness of a file profile change application by a node in cooperation with each other. This makes it possible to cooperatively create a more suitable file profile and improve search efficiency.

Figure 5:
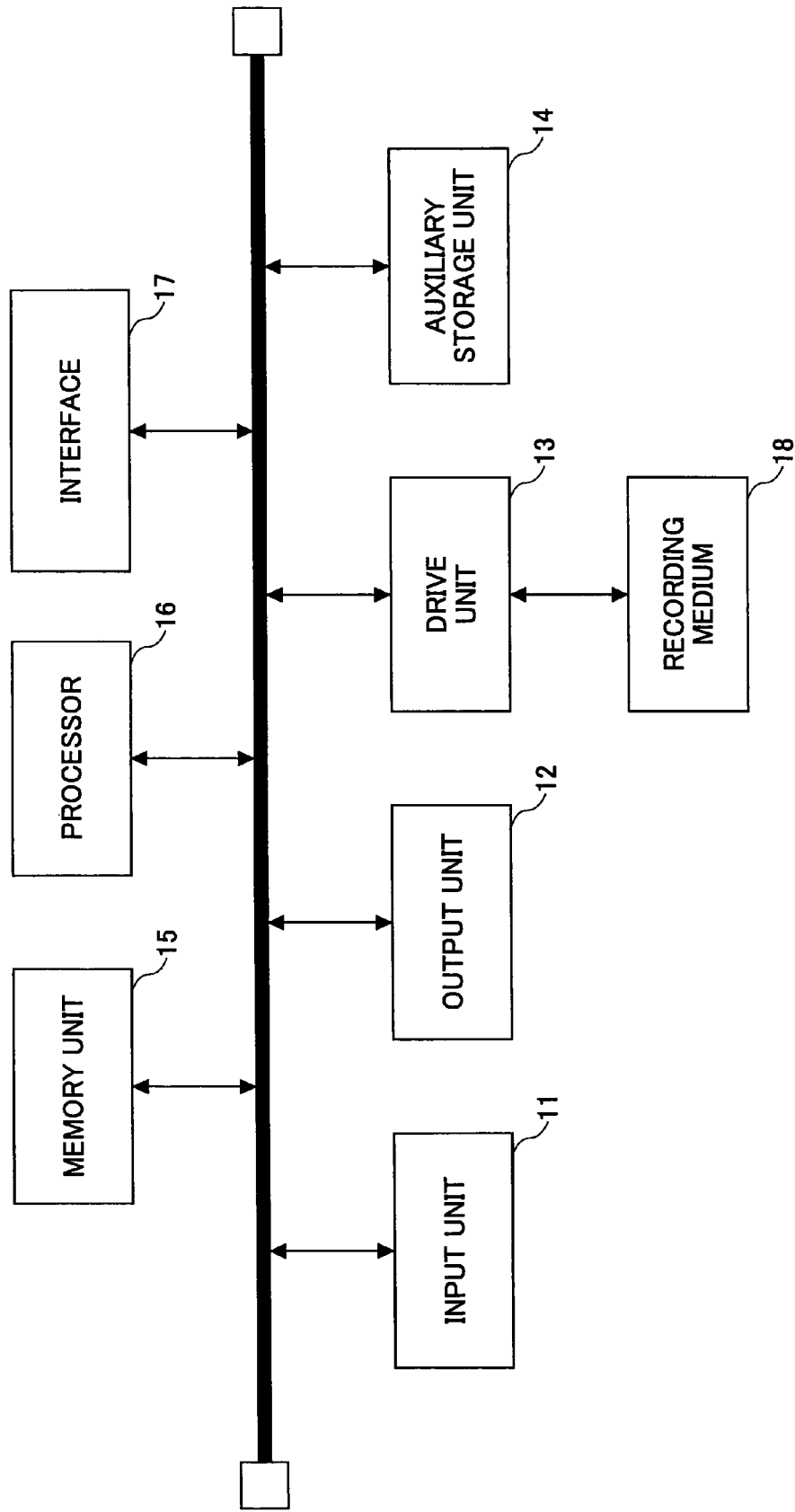
FIG. 5 is a block diagram showing a hardware configuration of a computer executing a file sharing program according to the first embodiment of the present invention.

Next, a description is given of a hardware configuration of a computer executing a file sharing program according to the present invention. FIG. 5 is a block diagram showing a hardware configuration of a computer executing a file sharing program according to the first embodiment of the present invention.

The computer of FIG. 5 includes an input unit 11, an output unit 12, a drive unit 13, an auxiliary storage unit 14, a memory unit 15, a processor 16, and an interface 17, all of which are interconnected via a bus. The devices forming the computer may be contained in a single housing or contained separately in multiple housings.

The input unit 11, which includes input devices such as a keyboard, a mouse, and a tablet, is used to input operational instructions and information. The output unit 12, which includes output devices such as a display and a printer, is used to output windows and information necessary for operations. The interface 17 is a device for establishing a connection to a network, and includes, for example, an NIC. Programs controlling the computer are provided through a recording medium 18 such as a CD-ROM. The recording medium 18 on which the programs are recorded is set in the drive unit 13. The programs are installed in the auxiliary storage unit 14 from the recording medium 18 through the drive unit 13.

As the recording medium 18 on which the programs are recorded, various types of recording media may be used. For instance, recording media on which information is optically, electrically, or magnetically recorded, such as CD-ROMs, flexible disks, and magneto-optical (MO) disks, and semiconductor memories in which information is electrically recorded, such as ROMs and flash memories, may be used.

The programs include those recorded on the recording media and the like of other computers connected to the computer of FIG. 5 via the interface 17. The programs recorded on the recording media and the like of the other computers are downloaded through the interface 17 to be installed in the auxiliary storage unit 14.

The auxiliary storage unit 14 stores the installed programs and files necessary for the processing of the programs. The memory unit 15 reads out the programs from the auxiliary storage unit 14 and stores them at the time of activation. The processor 16 can perform operations such as those described above in accordance with the programs stored in the memory unit 15. The programs include the file sharing program of the present invention.

Second Embodiment

According to a second embodiment of the present invention, when competition occurs at a node, in addition to the above-described procedure, the node having the competition conducts an approval check on or checks the approval by each of the nodes approving the competing file profile change applications. This makes it possible for a node to approve a file profile change application based on comparison with another competing file profile change application in the second embodiment.

Figure 6:
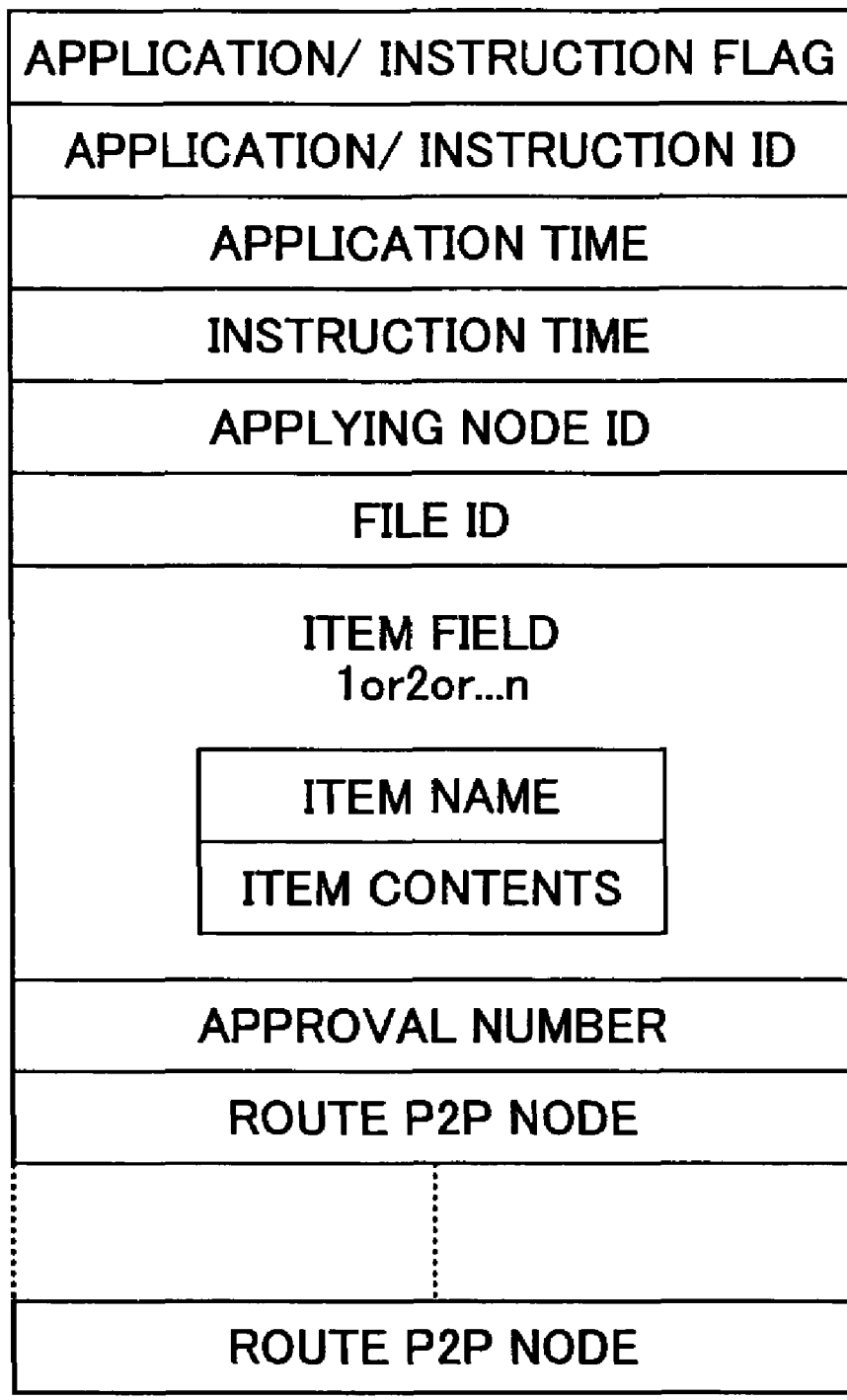
FIG. 6 is a diagram showing a format of the file profile change application and the file profile change instruction according to a second embodiment of the present invention.
Figure 7:
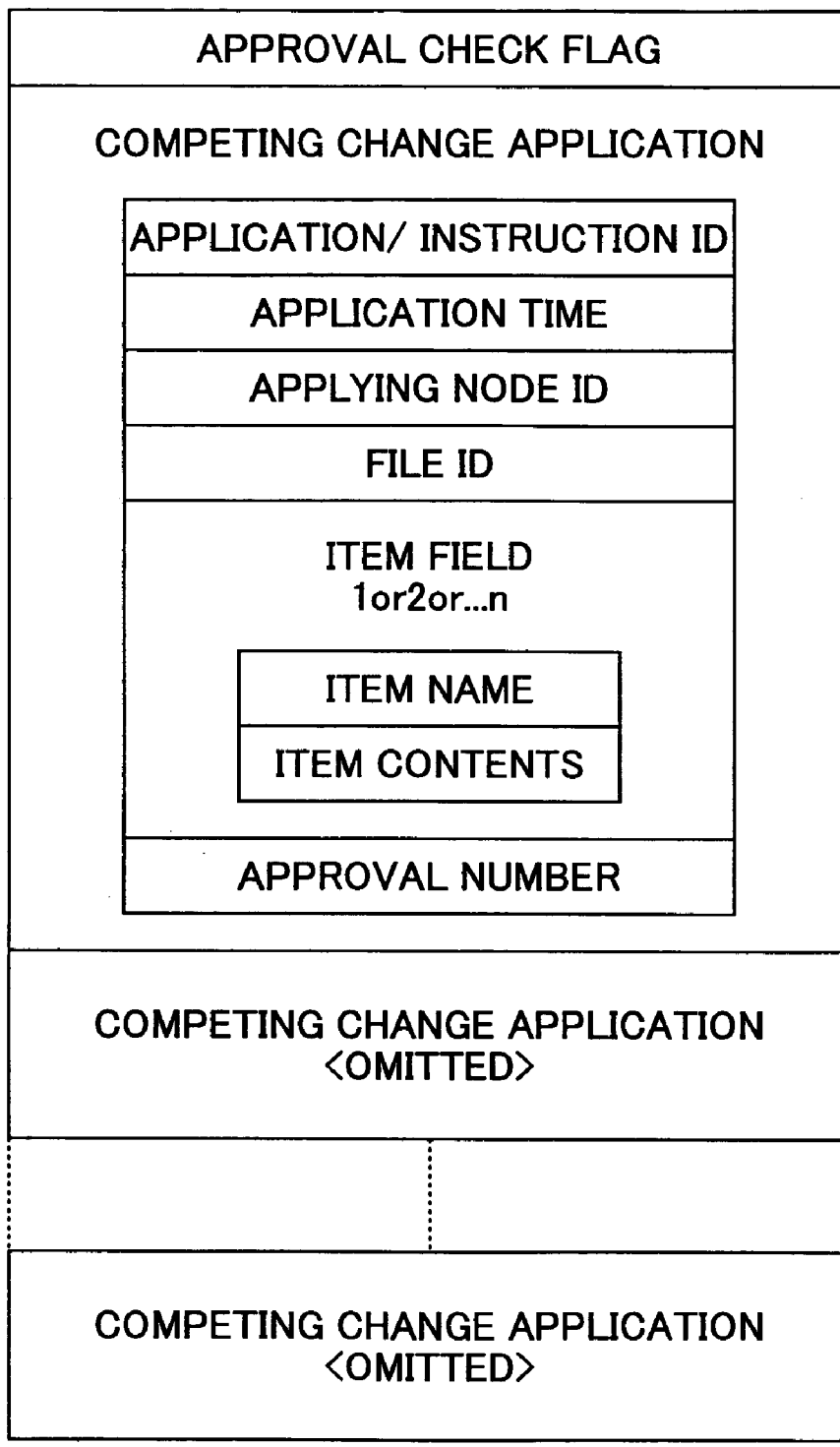
FIG. 7 is a diagram showing an approval check format according to the second embodiment of the present invention.
Figure 8:
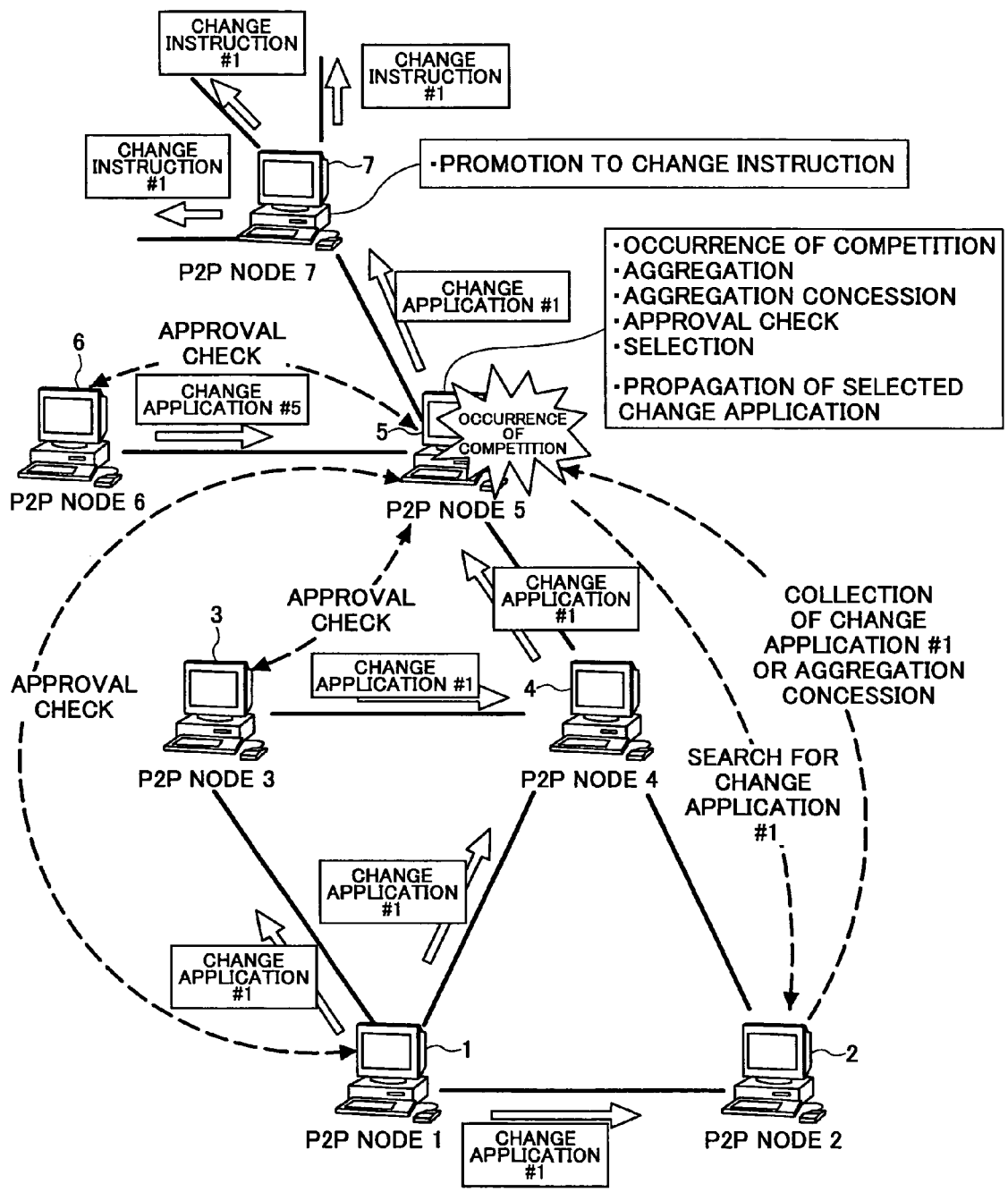
FIG. 8 is an image diagram showing a file profile change procedure according to the second embodiment of the present invention.

FIG. 6 is a diagram showing a format of the file profile change application and the file profile change instruction according to the second embodiment. FIG. 7 is a diagram showing an approval check format according to the second embodiment. FIG. 8 is an image diagram showing a file profile change procedure according to the second embodiment.

The format of the file profile change application and the file profile change instruction shown in FIG. 6 includes the node IDs of nodes through which the file profile change application or the file profile change instruction propagates as "route nodes" in addition to the information of the format of FIG. 3. A node receiving and propagating a file profile change application format or a file profile change instruction format adds its own node ID to the file profile change application format or the file profile change instruction format.

When competition occurs at a node, the node carries out an approval check on the nodes approving the competing file profile change applications using the approval check format shown in FIG. 7. The approval check format of FIG. 7 includes an approval check flag and multiple competing file profile change applications. The approval check flag indicates that the message is an approval check. Each competing file profile change application includes an application/instruction ID, an application time, an applying node ID, a file ID, an item field, and an approval number.

Next, a description is given of the file profile change procedure according to the second embodiment of the present invention.

Referring to FIG. 8, of the recipient nodes of the file profile change application (#1), the node 5, in which the file profile change application (#1) competes with another file profile change application (#5) (from the node 6) already retained by the node 5 and having the same item field to be changed, selects one of the competing file profile change applications and discards the other one of the competing file profile change applications based on their respective approval numbers. The probability of promotion of the discarded one of the competing file profile change applications to a file profile change instruction is reduced.

At the time of selecting one of the competing file profile change applications, referring to each competing file profile change application, the node 5 transmits the approval check of FIG. 7 to the route nodes of each competing file profile change application. Each route node receiving the approval check refers to the competing file profile change applications included in the approval check, and newly returns one of the competing file profile change applications that the route node approves to the transmitting node of the approval check. If the route node receiving the approval check approves none of the competing file profile change applications included in the approval check, the route node returns a blank message.

Each route node receiving the approval check stores the application/instruction IDs of all the competing file profile change applications included in the approval check in a cache, thereby preventing a file profile change application of the same application/instruction ID from being processed redundantly.

The response to the approval check from each route node stores the competing file profile change application that the route node approves on another occasion. If the route node approves none of the competing file profile change applications, the response stores no competing file profile change application, and is left blank. The node 5 corrects the approval number of each competing file profile change application based on the responses to the approval check. After performing the aggregation concession operation (if necessary), the aggregation operation, the approval check operation, and the selection operation, the node 5 propagates the selected file profile change application to another node.

Third Embodiment

According to a third embodiment of the present invention, a file profile change application is propagated preferentially to a node interested in the corresponding file profile based on the past search histories and change application promotion histories of the nodes. Thereby, a more appropriate, suitable file profile is created.

FIG. 9 shows a search history and change application promotion history list according to the third embodiment. According to the third embodiment, each node retains the search history and change application promotion history list individually. Each node refers to the search history and the change application promotion history of the search history and change application promotion history list retained by the node, and determines the other node or nodes to which to propagate the file profile change application next.

A node receiving a search request specifying a file profile increments the number of searches (search number) of the corresponding file ID, item name, and node ID in its search history and change application promotion history list. If there is no corresponding entry in the search history and change application promotion history list, the node creates a new entry in the search history and change application promotion history list, and increments the search number of the corresponding file ID, item name, and node ID.

A node receiving a file profile change instruction refers to an applying node ID, file ID, and item name in the file profile change instruction, and increments the number of change application promotions (change application promotion number) of the corresponding file ID, item name, and node ID. If there is no corresponding entry, the node creates a new entry and increments its change application promotion number.

A node receiving a file profile change application first refers to the route nodes of the file profile change application, and excludes the route nodes from the nodes to which to propagate the file profile change application next. Next, the node searches its search history and change application promotion history list with the file ID of a file to be changed and the specified item name, and selects a prescribed number of nodes with a large search number and a large change application promotion number.

It may be determined that a node has a large search number and a large change application promotion number based on, for instance, points calculated by adding the search number and the weighted change application promotion number as in the following Eq. (1):

$$\text{Points=Search Number+(Change Application Promotion Number×Weighting Index)}. \quad (1)$$

The prescribed number of nodes is the number of nodes to which to propagate a file profile change application next, the number of nodes being prescribed by the P2P system. If there is no other node to which to propagate the file profile change application as a result of searching the search history and change application promotion history list for nodes with a large search number and a large change application promotion number, the node conducts a transverse search with the item name irrespective of file IDs, calculates points using Eq. (1) in the same manner, and selects a node or nodes to which to propagate the file profile change application next.

Further, if there is no other node to which to propagate the file profile change application as a result of searching the search history and change application promotion history list transversely with the item name for nodes with a large search number and a large change application promotion number, the node selects a node or nodes to which to propagate the file profile change application next in accordance with normal P2P-network internode connections.

As described above, a node receiving a file profile change application selects a node or nodes to which to propagate the file profile change application, and propagates the file profile change application to the selected other nodes.

Fourth Embodiment

According to a fourth embodiment of the present invention, the initial approval number of a file profile change application is increased based on a past voting history, thereby prompting the voting activity of a node so that a more suitable file profile is created cooperatively.

In the above-described first, second and third embodiments, a node receiving a file profile change application propagates the file profile change application to another node after passage of a certain period of time irrespective of its voting activity expressing approval. In the fourth embodiment, a node individually retains the history of past voting activity as the number of votes (a voting number), and the initial approval number of a file profile change application is determined based on this voting number.

FIG. 10 is a diagram showing a configuration of the past voting history retained by a node. A node receiving a file profile change application votes for (approves) or against (disapproves of) the file profile change application. If the voting is performed within a certain period of time, the node increments the voting number indicating its past voting history.

The voting history of FIG. 10 is encrypted and protected by the application of the P2P system. A node is prevented from incrementing the voting number indicating its past voting history independently of its voting activity. On the other hand, at the time of creating a file profile change application, the node determines the approval number based on the voting number, for instance, as shown in the following Eq. (2):

$$\text{Initial Approval Number} = \text{ROUNDUP}(\text{Voting Number} \times \text{Weighting Index}), \quad (2)$$

where ROUNDUP indicates a roundup function to round up a value to the nearest whole number.

Fifth Embodiment

According to a fifth embodiment of the present invention, authority to change or modify a file profile (file profile change authority) is set, and a node having the file profile change authority is authorized to make a file profile change application, thereby preventing competition of file profile change applications so as to improve stability of the file sharing model of the P2P system.

First, a node to publish a file creates an authority token as shown in FIG. 11 for each item field of the file. FIG. 11 is a diagram showing a format of the authority token. A node having the authority token can make a file profile change application for changing the corresponding item field of the file.

In the initial state, the publishing node to publish the file has all the authority tokens of the file. A node wishing to make a file profile change application searches for a node currently having a corresponding authority token, and requests the authority token.

As shown in FIG. 11, the authority token includes an authority flag, a minimum retention time, a maximum retention time, a file ID, and an item field. The minimum retention time and the maximum retention time are thus determined in the authority token. If a time for which a node has retained the authority token (authority token retention time) is shorter than or equal to the minimum retention time, the node having the authority token cannot pass the authority token to another node. On the other hand, if the authority token retention time is longer than or equal to the maximum retention time, the node having the authority token, when receiving a request for the authority token from another node, is required to pass the authority token to the requesting node without fail.

If requests for the authority token from other nodes are stocked, a node having the authority token determines the next node to which to pass the authority token based on the past voting histories of the other requesting nodes. For example, the other requesting nodes notify the node having the authority token of their past voting histories by including their past voting histories in their respective requesting messages.

In the P2P system, by setting the minimum retention time so that the minimum retention time is sufficiently longer than the period of validity of the file profile change application, it is possible to prevent frequent occurrence of competition due to origination of numerous file profile change applications in a period.

According to one embodiment of the present invention, if the number of approvals of a file profile change application exceeds a predetermined amount, the change application is promoted to a file profile change instruction, and file profile information is changed based on the change instruction. Accordingly, the file profile information is prevented from being changed unless the number of approvals obtained exceeds the predetermined amount. That is, the file profile information is changed based on a change application that has obtained approvals of which the number exceeds the predetermined amount. As a result, it is possible to create the file profile information cooperatively based on approval by nodes exceeding the predetermined amount. Thus, it is possible to provide a recording medium on which is recorded a file sharing program and a file sharing apparatus that enable multiple nodes to create a more suitable file profile in cooperation with each other.

The present invention is not limited to the specifically disclosed embodiments, and variations and modifications may be made without departing from the scope of the present invention.

The present application is based on Japanese Priority Patent Application No. 2005-183816, filed on Jun. 23, 2005, the entire contents of which are hereby incorporated by reference.

What is claimed is:

1. A computer-readable recording medium on which is recorded a file sharing program to be executed in a computer connected to a network including a plurality of nodes and sharing a file with the nodes in a decentralized manner, the computer including a storage part configured to store an entity of the file, a file list including the file, and profile information of the file, the file sharing program causing the computer to execute, on a processor thereof, a method comprising the steps of:

(a) checking an application time when a change application for changing the profile information of the file is applied by an applying one of the nodes and determining, based on the application time of the change application, whether a predetermined period of time for which the change application is valid is exceeded upon receiving the change application;

(b) changing a number of approvals by those of the nodes approving the change application in response to said step (a) determining that the predetermined period of time is not exceeded;

(c) promoting the change application to a change instruction to change the profile information of the file, propagating the change instruction to another one of the nodes, and changing the profile information of the file stored in the storage part in response to the change instruction, if a number of the approvals by the approving nodes and an approval by the computer exceeds a predetermined amount;

(d) propagating the change application including the changed number of approvals to the other one of the nodes if the number of the approvals by the approving nodes and the approval by the computer does not exceed the predetermined amount;

(e) if the change application competes with another change application, aggregating the approvals of the change application by the approving nodes and approvals of the other change application by those of the nodes approving the other change application and comparing the number of the approvals of the change application and a number of the approvals of the other change application;

(f) selecting one of the competing change applications and discarding the other one of the competing change applications based on their respective approval numbers; and (g) conducting an approval check on the approving nodes approving the change application and the approving nodes approving the other change application if the change application competes with the other change application.

2. The computer-readable recording medium as claimed in claim 1, wherein the method further comprises the step of (h) creating a change application for changing the profile information of the file and transmitting the change application to the other one of the nodes.

3. The computer-readable recording medium as claimed in claim 2, wherein the method further comprises the step of (i) increasing an initial approval number of the change application created by said step (h) based on a past voting history with respect to the file stored in the storage part.

4. The computer-readable recording medium as claimed in claim 2, wherein the method further comprises the step of (i) authorizing the creation of the change application by said step (h) if the computer has authority to change the profile information of the file.

5. The computer-readable recording medium as claimed in claim 1, wherein the method further comprises the step of (h) selecting the other one of the nodes to which to propagate the change application based on a search history and a change application promotion history with respect to the file stored in the storage part.

6. The computer-readable recording medium as claimed in claim 1, wherein each of the change application and the change instruction is created with a format having an item field storing an item name and item contents of the profile information.

7. A file sharing apparatus connected to a network including a plurality of nodes and sharing a file with the nodes in a decentralized manner, the file sharing apparatus comprising:
a storage part configured to store an entity of the file, a file list including the file, and profile information of the file;
a communication part configured to receive and transmit a change application for changing the profile information of the file and a change instruction to change the profile information of the file; and
a processor configured to:
check an application time when the change application is applied by an applying one of the nodes and determine, based on the application time of the change application, whether a predetermined period of time for which the change application is valid is exceeded upon receiving the change application;
change a number of approvals by those of the nodes approving the change application in response to determining that the predetermined period of time is not exceeded;
promote the change application to the change instruction, propagate the change instruction to another one of the nodes via the communication part, and change the profile information of the file stored in the storage part in response to the change instruction, if a number of the approvals by the approving nodes and an approval by the file sharing apparatus exceeds a predetermined amount; and
propagate the change application including the changed number of approvals to the other one of the nodes via the communication part if the number of the approvals by the approving nodes and the approval by the file sharing apparatus does not exceed the predetermined amount;
if the change application competes with another change application, aggregate the approvals of the change application by the approving nodes and approvals of the other change application by those of the nodes approving the other change application and compare the number of the approvals of the change application and a number of the approvals of the other change application;
select one of the competing change applications and discard the other one of the competing change applications based on their respective approval numbers; and
conduct an approval check on the approving nodes approving the change application and the approving nodes approving the other change application if the change application competes with the other change application.

8. The computer-readable recording medium as claimed in claim 1, wherein the method further comprises the step of discarding the change application in response to said step (a) determining that the predetermined period of time is exceeded.

9. The file sharing apparatus as claimed in claim 7, wherein the processing part is further configured to discard the change application in response to determining that the predetermined period of time is exceeded.

* * * * *